United States Patent
Minks

(10) Patent No.: US 12,265,871 B2
(45) Date of Patent: Apr. 1, 2025

(54) CHIP CARD, AND PROCESS FOR MANUFACTURING A CHIP CARD

(71) Applicant: GIESECKE+DEVRIENT EPAYMENTS GMBH, Munich (DE)

(72) Inventor: Andreas Minks, Bad Wiessee (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/552,257

(22) PCT Filed: Mar. 23, 2022

(86) PCT No.: PCT/EP2022/025118
§ 371 (c)(1),
(2) Date: Sep. 25, 2023

(87) PCT Pub. No.: WO2022/199894
PCT Pub. Date: Sep. 29, 2022

(65) Prior Publication Data
US 2024/0176977 A1 May 30, 2024

(30) Foreign Application Priority Data
Mar. 25, 2021 (DE) .................. 10 2021 001 579.7

(51) Int. Cl.
*G06K 19/077* (2006.01)
(52) U.S. Cl.
CPC .............. *G06K 19/07722* (2013.01)
(58) Field of Classification Search
None
See application file for complete search history.

(56) References Cited

U.S. PATENT DOCUMENTS

| 2016/0110639 A1* | 4/2016 | Finn ................. G06K 19/07788 |
| | | 235/492 |
| 2018/0204105 A1 | 7/2018 | Herslow et al. |
| 2018/0339503 A1* | 11/2018 | Finn ..................... H01Q 1/2225 |
| 2020/0250504 A1 | 8/2020 | Lotya et al. |
| 2021/0049439 A1 | 2/2021 | Finn |

FOREIGN PATENT DOCUMENTS

| WO | 2017095329 A1 | 6/2017 |
| WO | 2018034449 A1 | 2/2018 |

OTHER PUBLICATIONS

International Search Report from corresponding PCT Application No. PCT/EP2022/025118, Jul. 20, 2022.
German Search Report from corresponding DE Application No. 102021001579.7, Oct. 26, 2021.

\* cited by examiner

*Primary Examiner* — Kristy A Haupt
(74) *Attorney, Agent, or Firm* — Workman Nydegger

(57) ABSTRACT

A chip card has a flexible inlay including chip card contacts on an upper face of the inlay and which supports an integrated circuit and an antenna, both of which are spaced apart from the contacts. The chip card further includes a top layer with a recess in which the contacts are placed, and a metal layer which is located below the inlay and includes a slit that extends from a peripheral surface of the metal layer to the area of the recess and extends through the entire thickness of the metal layer.

11 Claims, 2 Drawing Sheets

CHIP CARD, AND PROCESS FOR MANUFACTURING A CHIP CARD

BACKGROUND

The invention relates to a chip card and to a process for manufacturing a chip card.

Card-shaped data carriers, in particular chip cards, are used in many areas, for example to carry out transactions of cashless payments, as identity documents, or to prove access authorizations. A chip card includes a card body and an integrated circuit embedded in the card body, for example in the form of a chip module having a chip. The chip module is typically inserted into a cavity or module opening of the card body.

Chip modules or chip cards having an integrated coil are considered hereinafter, these enabling contactless communication. For example, chip card controllers having RFID functionality can be used.

Chip cards having a metallic surface are particularly insensitive and are viewed as valuable. Chip cards having an internal or external metal layer are therefore becoming increasingly widespread.

The functionality of such a chip card is that a chip module is used which itself contains a coil (coil on module). This coil couples with a metal layer on the card body. This coupling only functions when a slot is contained in the metal card body. This slot is required to prevent the undesired ring closure of the magnetic flux.

Disadvantageous shielding of the antenna arises with the introduction of a metallic layer, in spite of the slot.

SUMMARY

The object of the present invention is therefore that of providing a chip card having an improved antenna.

This object is achieved by a chip card or a process for manufacturing a chip card according to the independent claims. Embodiments and refinements of the invention are specified in the dependent claims.

A chip card according to the invention comprises a flexible inlay having contacts of the chip card arranged on an upper side of the inlay, wherein the inlay carries an integrated circuit and antenna spaced apart from the contacts, an upper layer having a recess, in which the contacts are arranged, and a metal layer arranged below the inlay having a slot, which extends from a circumferential surface of the metal layer up to the area of the recess and extends through the entire thickness of the metal layer.

One basic concept of the present invention is that the integrated circuit and/or the antenna can be displaced out of the area of the recess by means of an inlay and nonetheless a metal layer is present in the chip card.

The card body proposed here thus has the advantage that the chip card has an enlarged antenna, by which both the transmission power and the energy introduction are increased.

It can be provided that the upper layer is a further metal layer having a slot, which extends from a circumferential surface of the further metal layer up to the recess and extends through the entire thickness of the further metal layer. A so-called metal face card can be provided with the upper layer as further metal layer. In this card, the front side and the rear side consist of valuable metal.

It can furthermore be provided that an adhesive layer having a further recess is provided between the further metal layer and the inlay, that the further recess of the adhesive layer has smaller dimensions than the recess of the further metal layer, and that a part of the adhesive layer is arranged between the contacts and an inner wall of the recess of the further metal layer. In this way, the adhesive layer can provide an electrical insulation between the further metal layer and the recess.

It can be provided that the upper layer comprises a layer having optical features and an outer overlay layer. These two layers can consist of a plastic and can be used for example for security features in the optical, IR, and/or UV range and also for design features. Moreover, items of information can be made available.

It can furthermore be provided that the metal layer is covered using at least one outer layer. This layer/these layers can consist of a plastic and can be used for example for security features in the optical, IR, and/or UV range and also for design features. Moreover, items of information can be made available.

It can be provided that an insert is arranged below the contacts, which positions the contacts in the recess of the upper layer. This insert consists for example of a plastic and can have identical dimensions to the contacts. During the manufacturing of the chip card, the insert can press the contacts in the recess into the correct position, so that the contacts are surface flush with the upper layer. Since the metal layer is present below the insert, a targeted and planar pressure can be exerted on the insert in a simple manner. This facilitates the manufacturing of the chip card, in particular the positioning of the contacts in the recess of the upper layer. The insert can be formed as a single element or as part of a layer, for example the inlay or a layer arranged below it.

It can furthermore be provided that a height of the insert, of the inlay, and of the contacts corresponds to a height of the recess of the upper layer. It can be ensured easily in this way that the contacts are surface flush with the upper layer.

It can be provided that inner edges of the recess of the upper layer are provided with a chamfer. On the one hand, self-centering of the contacts in the recess during the joining of the layers can be achieved. On the other hand, excessive squeezing or even damage of the inlay during the joining can be prevented, in particular in the case of a metal layer.

It can furthermore be provided that the antenna is arranged in the area of a circumferential surface of the chip card. The chip card can thus have an enlarged antenna, by which both the transmission power and the energy introduction are increased. If the turns of the antenna are arranged in the area of the circumferential surface, i.e. as far as possible on the outside, the size or the diameter of the antenna can be maximized.

A process according to the invention for manufacturing a chip card comprises the following steps:
  providing a flexible inlay having contacts of the chip card arranged on an upper side of the inlay,
  wherein the inlay carries an integrated circuit and antenna spaced apart from the contacts,
  arranging an upper layer having a recess on the upper side of the inlay such that the contacts are arranged in or on the recess,
  arranging a metal layer having a slot below the inlay, which extends from a circumferential surface of the metal layer into the area of the recess and which extends through the entire thickness of the metal layer, and
  laminating the layers to form a chip card.

The various steps of the method can also be executed in other sequences. For example, the contacts can first be arranged in the recess upon the lamination of the layers. The contacts are then previously arranged at the recess, for example positioned below the recess. Otherwise, the same advantages and modifications as described above apply.

BRIEF DESCRIPTION OF THE DRAWINGS

The present invention will be described hereinafter by way of example with reference to the appended drawings, in which.

DETAILED DESCRIPTION OF VARIOUS EMBODIMENTS

Figure 1:
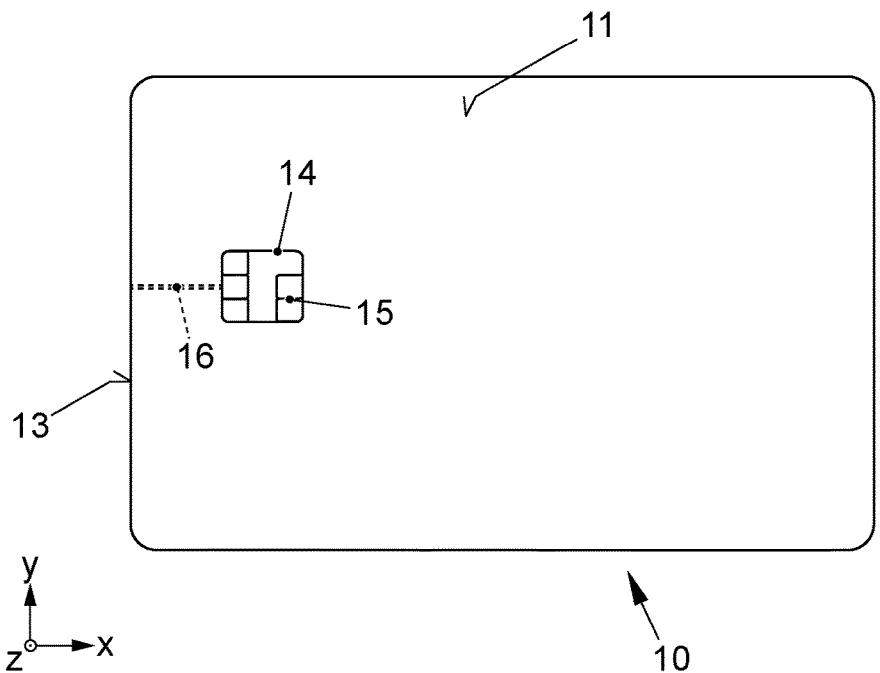
FIG. 1: shows a top view of a chip card.
Figure 2:
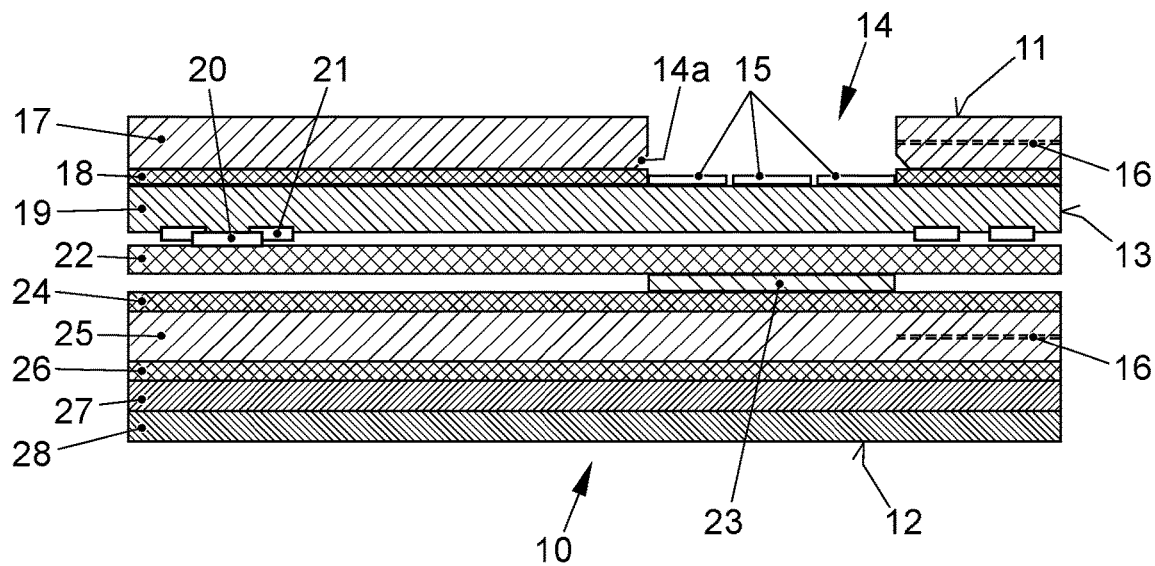
FIG. 2: shows a sectional illustration of a chip card having two metal layers.

FIG. 1 shows a chip card 10 having a card body. The chip card 10 has an essentially rectangular basic shape having two opposing main surfaces, of which one main surface 11 is visible in FIG. 1. The other, opposing main surface 12 is shown in FIG. 2. The two main surfaces 11, 12 run parallel to one another and are connected by a peripheral circumferential surface 13.

The chip card 10 has a rectangular shape in an x-y plane, in which the circumferential surface 13 lies, having two longitudinal surfaces running in the x direction and two end faces running in the y direction. The thickness or height of the chip card 10 extends in the z direction.

A recess 14 for contacts 15 of the chip card 10 is left out in the main surface 11 of the chip card 10. The recess 14 extends into the chip card 10. The recess 14 is created, for example, by means of a laser work step or milling work step.

A slot 16 is provided in the chip card 10 in a metal layer, which extends from the circumferential surface 13 or in other words from an outer edge of the chip card 10 to the recess 14. The slot 16 runs in the y direction, i.e. parallel to the longitudinal surface. The slot 16 has, for example, a width between 30 μm and 100 μm, preferably between 50 μm and 80 μm.

In FIG. 1, the slot 16 is shown on a left side. The slot 16 can also be arranged on a right, upper, or lower side of the chip card 10. The slot 16 is used to avoid short-circuit currents or eddy currents.

FIG. 2 shows a sectional illustration of a chip card 10. The chip card 10 is a layer stack having two main surfaces 11 and 12, between which the individual layers are preferably arranged parallel to one another. The individual layers can be connected or fixed with one another by means of adhesives, which are at least partially electrically insulating.

In the layer stack of the chip card 10 shown in FIG. 2, an upper layer 17 in the form of an outer metal layer is arranged on top or on the front side of the chip card 10. A recess 14, which is configured to receive the contacts 15 of the chip card 10, is arranged in this upper metal layer. The recess 14 penetrates the entire thickness of the layer and has dimensions which correspond to the dimensions of the contacts 15. A chamfer 14a, which facilitates an insertion of the contacts 15 into the recess 14, is provided at a lower edge of the recess 14.

The slot 16, which is used to avoid eddy currents or short circuits, is formed in the upper metal layer 17. The slot 16 penetrates the upper metal layer 10 in its entire thickness or height.

FIG. 2 shows the layer stack of the chip card 10 during the production of the chip card 10. The individual layers of the layer stack are already aligned or positioned in relation to one another, however the chip card 10 is not yet laminated.

An adhesive layer 18 adjoins below the upper layer 17. The term "below" means opposite to a front side 11 of the chip card 10, thus in a certain sense into the interior of the chip card 10.

An inlay 19, made for example of flexible plastic such as PET, is arranged below this adhesive layer 18. The inlay 19 bears the contacts 15, which consist for example of aluminum, on an upper side. An integrated circuit 20, for example in the form of a chip, is arranged on a lower side of the inlay 19. For example, a flip-chip process can be used.

Furthermore, a coil or antenna 21 is arranged on the lower side of the flexible inlay 19. The antenna 21 supplies the integrated circuit 20 with energy and/or signals. An electromagnetic field exiting from the upper metal layer 17 or the recess 14 can thus be coupled into the antenna 21. Magnetic field lines run through the recess 14 here.

For contacting of the chip card 10 via the contacts 15, the integrated circuit 20 is connected to the contacts via internal lines (not shown here) of the inlay 19. The chip card 10 can thus provide a dual interface functionality.

The integrated circuit 20 and/or the antenna 21 can also be arranged on the upper side of the flexible inlay 19. The individual turns of the antenna 21 are arranged in the area of a circumferential surface 13 of the chip card 10. The size or the diameter of the antenna 21 can thus be maximized. This improves both the energy introduction into the integrated circuit 20 and the data transmission to the integrated circuit 20.

The adhesive layer 18 also has a recess 14. It can be provided that this recess 14 of the adhesive layer 18 has smaller dimensions than the recess 14 of the upper metal layer 17. This has the result that when the contacts 15 are pressed from below into the recess 14, the area of the adhesive layer 18 protruding into the recess 14 of the upper metal layer 17 covers the side walls of the recess 14 of the upper metal layer 17. This results in an electrical insulation between the contacts 15 and the upper metal layer 17. An electrically nonconductive adhesive layer 18 is used for this purpose.

An optional PVC layer 22 adjoins below the flexible inlay 19. This layer can be used as electrical insulation for further following metal layers and/or this PVC layer 22 can protect the flexible inlay 19 during the assembly of the chip card 10. An insert 23, the dimensions of which correspond to the dimensions of the recess 14, is arranged below the PVC layer 22. During assembly of the chip card 10, this insert is pushed or pressed upward, i.e., in the direction of the recess 14, by which the contacts 15 are displaced upward into the recess 14. The PVC layer 22 can protect the inlay 19 or the antenna 21 here.

The height of the insert 23, of the PVC layer 22, of the inlay 19, and of the contacts 15 can correspond here to the height or depth of the recess 14 in the upper layer 17, here in the form of a metal layer. It is thus ensured that the surface of the contacts 15 terminates flush with the main surface 11 of the chip card 10.

A further adhesive layer 24 is arranged below the insert 23. A further metal layer 25 adjoins this adhesive layer 24. This metal layer 25 too has a slot 16, which extends from the circumferential surface 13 of the chip card 10 or the metal layer 25 into the area of the recess 14. No recess 14 is located within this inner metal layer 25, i.e. the inner metal layer 25 extends over the entire surface through the chip card 10. Accordingly, the slot 16 extends up to a projection of the recess 14.

Further layers can adjoin below the metal layer, as shown in FIG. 2. It is also possible that the structure of the chip card 10 ends at the rear side, lying on the bottom here, with the metal layer 25.

In the present case, an adhesive layer 26 adjoins the metal layer 25. A layer 27 having optical features and an external overlay layer 28 can thus be provided below the adhesive layer 26. The optical feature/features can comprise, for example, security features, items of information, and/or decorative elements. Further optical effects may be achieved by means of one or more of the overlay layers 28, and the layer 27 can be protected.

Figure 3:
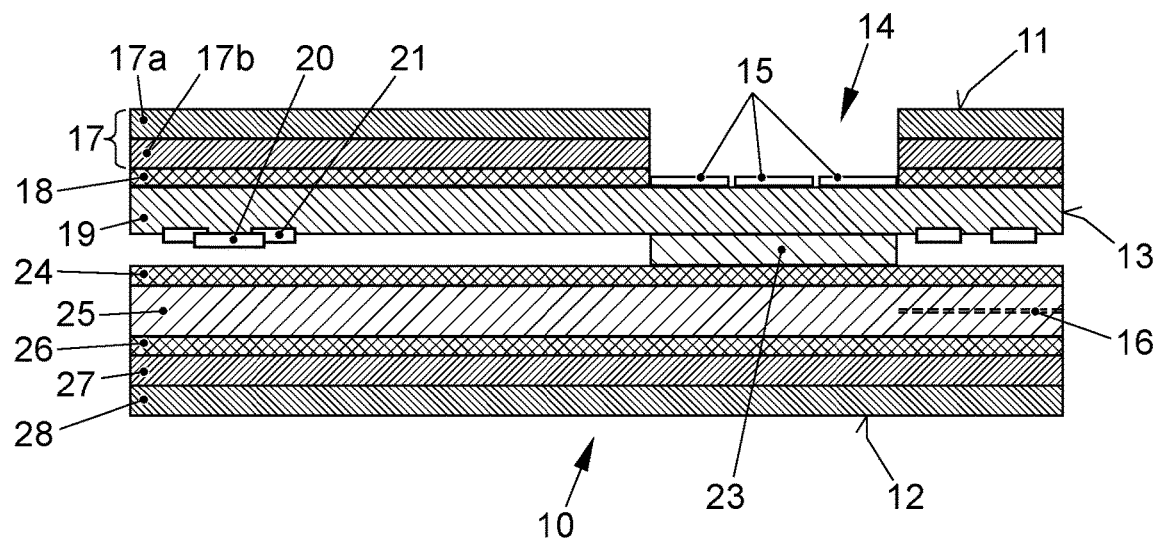
FIG. 3: shows a sectional illustration of a chip card having one metal layer.

FIG. 3 shows a further exemplary embodiment of a chip card 10. The structure or the layer sequence of the chip card 10 from FIG. 3 is similar to the structure of the chip card shown in FIG. 2. Accordingly, reference is partially made to FIG. 2.

The upper layer 17 consists here of an overlay layer 17a and an inner layer 17b having optical features. The two layers 17a and 17b can correspond, for example, to the two layers 28 and 27 from FIG. 2.

The recess 14 is left out in the two layers 17a and 17b. A chamfer as in FIG. 2 can also be provided. An adhesive layer 18 again adjoins the inner layer 17b having optical features. A flexible inlay 19, which corresponds to the flexible inlay 19 from FIG. 2, adjoins the adhesive layer 18. The further adhesive layers 24 and 26 and the inner metal layer 25 also correspond to the layers shown in FIG. 2. The same applies for the inner layer 27 having optical features and the overlay layer 28. The three layers 26, 27, and 28 are again optional.

The chip card 10 can have, for example, a thickness or height of approximately 920 μm. The thickness of the entire card body 10 is not to exceed the maximum thickness of a chip card body according to ISO 7810.

Figure 4:
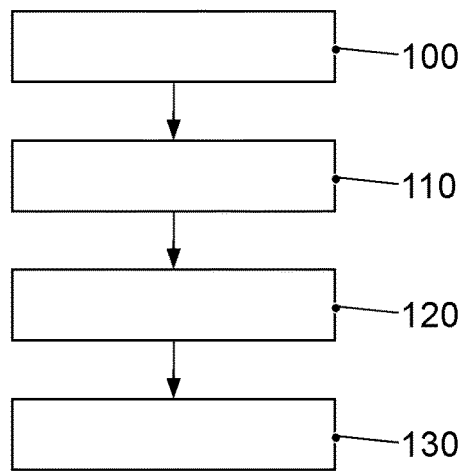
FIG. 4: shows a schematic illustration of a process for manufacturing a chip card.

FIG. 4 shows a schematic illustration of a process for manufacturing a chip card 10. The process essentially describes the manufacturing of the chip card 10 shown in FIG. 3.

In a first step 100, a flexible inlay 19 is provided having contacts 15 of the chip card 10 arranged on an upper side of the inlay 19, wherein the inlay 19 carries an integrated circuit 20 and antenna 21 spaced apart from the contacts 15.

In a second step 110, an upper layer 17 having a recess 14 is arranged on the upper side of the inlay 19 in such a way that the contacts 15 are arranged in or at the recess 14. This arrangement can comprise aligning or positioning and optionally an adhesive procedure. The contacts 15 can already be arranged partially in the recess 14 or at, i.e. below, the recess 14.

In a third step 120, an inner metal layer 25 having a slot 16 is arranged below the inlay 19, which extends from a circumferential surface 13 of the metal layer 25 into the area of the recess 14 and extends through the entire thickness of the metal layer 25. An adhesive, for example in the form of an adhesive layer 26, can be applied between the inner metal layer 25 and the inlay 19.

An insert 23 can optionally be arranged between the metal layer 25 and the inlay 19. The dimensions of the insert 23 correspond to the dimensions of the recess 14.

In a fourth step 130, the individual layers are laminated to form a chip card 10. The individual layers of the chip card 10 are joined under the action of heat and pressure.

During the lamination or assembly of the chip card 10, the insert 23, if it is provided, is pressed into the recess 14, by which the contacts 15 are displaced upward to the main surface 11.

A layer 27 having optical features and an external overlay layer 28 can optionally be provided on the lower side of the metal layer 25. The optical feature/features can comprise, for example, security features, items of information, and/or decorative elements. Further optical effects can be achieved and the layer 27 can be protected by means of one or more of the overlay layers 28.

The various steps of the method can also be executed in other sequences. It is also possible to join multiple layers in a single adhesive procedure.

The invention claimed is:

1. A chip card, including:
   a flexible inlay having contacts of the chip card arranged on an upper side of the inlay,
   wherein the inlay carries an integrated circuit and antenna spaced apart from the contacts,
   an upper layer having a recess, in which the contacts are arranged, and
   a metal layer arranged below the inlay, having a slot, which extends from a circumferential surface of the metal layer into an area of the recess, and which extends through an entire thickness of the metal layer;
   wherein at least one of the integrated circuit and the antenna are displaced out of the area of the recess by the inlay.

2. The chip card according to claim 1, wherein the upper layer is a further metal layer having a slot, which extends from a circumferential surface of the further metal layer to the recess and extends through the entire thickness of the further metal layer.

3. The chip card according to claim 2, wherein an adhesive layer having a further recess is provided between the further metal layer and the inlay, in that the further recess of the adhesive layer has smaller dimensions than the recess of the further metal layer, and in that a part of the adhesive layer is arranged between the contacts and an inner wall of the recess of the further metal layer.

4. The chip card according to claim 1, wherein the upper layer comprises a layer having optical features and an outer overlay layer.

5. The chip card according to claim 1, wherein the metal layer is covered using at least one outer layer.

6. The chip card according to claim 1, wherein an insert is arranged below the contacts, which positions the contacts in the recess of the upper layer.

7. The chip card according to claim 6, wherein a height of the insert, of the inlay, and of the contacts corresponds to a height of the recess of the upper layer.

8. The chip card according to claim 1, wherein inner edges of the recess of the upper layer are provided with a chamfer.

9. The chip card according to claim 1, wherein the antenna is arranged in the area of a circumferential surface of the chip card, wherein turns of the antenna are arranged to have a maximum diameter about the circumferential surface.

10. A process for manufacturing a chip card, having the following steps:
    providing a flexible inlay having contacts of the chip card arranged on an upper side of the inlay,
    wherein the inlay carries an integrated circuit and antenna spaced apart from the contacts,
    arranging an upper layer having a recess on the upper side of the inlay in such a way that the contacts are arranged in the recess, arranging a metal layer having a slot below the inlay, which extends from a circumferential surface of the metal layer into an area of the recess and extends through an entire thickness of the metal layer, and laminating the layers to form the chip card;

wherein at least one of the integrated circuit and the antenna are displaced out of the area of the recess by the inlay.

11. A chip card, including:

a flexible inlay having contacts of the chip card arranged on an upper side of the inlay, wherein the inlay carries an integrated circuit and antenna spaced apart from the contacts, an upper layer having a recess, in which the contacts are arranged, and a metal layer arranged below the inlay, having a slot, which extends from a circumferential surface of the metal layer into an area of the recess, and which extends through an entire thickness of the metal layer;

wherein the upper layer is a further metal layer having a slot, which extends from a circumferential surface of the further metal layer to the recess and extends through the entire thickness of the further metal layer; and wherein an adhesive layer having a further recess is provided between the further metal layer and the inlay, in that the further recess of the adhesive layer has smaller dimensions than the recess of the further metal layer, and in that a part of the adhesive layer is arranged between the contacts and an inner wall of the recess of the further metal layer.

* * * * *